United States Patent [19]
Allen et al.

[11] 3,808,833
[45] May 7, 1974

[54] COMPACT TRANSPIRATION COOLING SYSTEM

[75] Inventors: Redfield W. Allen, Silver Spring; Louis B. Weckesser, College Park, both of Md.

[73] Assignee: The United States of America as represented by the Secretary of the Navy, Washington, D.C.

[22] Filed: Apr. 3, 1973

[21] Appl. No.: 347,731

[52] U.S. Cl. .................... 62/467, 62/315, 244/117, 244/124
[51] Int. Cl. ..................................................... F25b
[58] Field of Search .......... 244/117 A, 124; 62/315, 62/467

[56] References Cited
UNITED STATES PATENTS

| | | | |
|---|---|---|---|
| 2,468,820 | 5/1949 | Goddard | 62/315 |
| 2,873,933 | 2/1959 | Fanti | 244/117 A |
| 2,908,455 | 10/1959 | Hoodley | 62/315 |
| 2,941,759 | 6/1960 | Rice | 244/117 A |
| 3,082,611 | 3/1963 | Alves | 244/117 A |
| 3,138,009 | 6/1964 | McCreight | 62/315 |
| 3,172,621 | 3/1965 | Erwin | 244/124 |
| 3,114,524 | 12/1963 | Conn | 244/124 |

Primary Examiner—William J. Wye

[57] ABSTRACT

A transpiration cooling system for dissipating heat loads in sharp edges of flight vehicle structures moving at hypersonic velocities and sharp leading edges of gas turbine blades operation in high temperature environments, the invention comprises a compact plenum formed by a longitudinal coolant passage having a longitudinal porous segment in its wall, the compact plenum passage fitting within the leading edge structure and extending along the leading edge in a direction transverse to the external hot gas flow. Pressurized gaseous coolant, supplied by a remote reservoir or engine compressor thus flows within the compact plenum inside the leading edge structure and also transpires in a forward direction from the compact plenum through the porous segment and into the critically heated forward stagnation line region of the sharp leading edge structure.

10 Claims, 4 Drawing Figures

(a) PRESSURE COEFFICIENT BASED ON NEWTONIAN FLOW
(b) BLOWING RATIO BASED ON:
1. FREE STREAM MACH NUMBER = 7
2. FREE STREAM PRESSURE = 15 PSIA
3. COOLANT PRESSURE = 1800 PSIA
4. $(\rho v)\phi$ = DENSITY TIMES VELOCITY OF THE FLUID AT A HALF ANGLE OF $\phi$
5. $(\rho v)90°$ = DENSITY TIMES VELOCITY OF THE FLUID AT HALF ANGLE OF 90°

3,808,833

COMPACT TRANSPIRATION COOLING SYSTEM

BACKGROUND AND SUMMARY OF THE INVENTION

The invention relates to structures capable of withstanding thermal shock as well as the continuous high temperature environment encountered by leading edges of hypersonic flight structures and leading edges of blades in high temperature gas turbines. Since the stagnation region along the leading edge of an aerodynamic surface is the most critically heated portion thereof, a leading edge cooling mechanism must be provided to prevent distortion or destruction of the aerodynamic capability of the leading edge. Up to the present time, high temperature environments have been countered by the use of high temperature alloys, ablative materials, internal cooling passages, or large plenum transpiration cooling systems. Under the extreme thermal conditions in the leading edge region alloy materials often prove useless and ablation materials prove impractical due to the geometric changes which occur with material loss. Transpiration cooling systems utilizing gas or liquid have previously been proposed. Liquid transpiration cooling systems lack stability and are relatively uncontrollable. Gas transpiration systems make more effective use of coolant reserves by efficient control of the rate at which coolant is released through the transpiration structure. Prior gas transpiration systems have employed relatively large plenum chambers coupled to coolant feeder lines sufficient in size and number to virtually preclude spatial variations of coolant pressure and temperature within the plenum chambers. Presently proposed hypersonic flight vehicles and gas turbine blades offer less space for plenum feeder lines due to the aerodynamic requirement of small radius leading edges. This causes plenum coolant pressure and temperature to be subject to spatial distribution and poses the problem of situating a large plenum transpiration cooling system within the confines of the small radius leading edges. The compact gas transpiration cooling invention provides a cooling means compatible with the requirements that leading edges be relatively thin and of nondegradable geometry.

The present compact gas transpiration cooling system comprises a longitudinal porous leading edge segment supplied with coolant gas from a longitudinal plenum passage generally disposed parallel to the porous leading edge. The coolant gas is supplied to the longitudinal plenum from a pressurized storage reservoir or engine compressor, the coolant flow passing through a delivery line and flow control device prior to entry into the compact plenum. Gaseous coolant entering the compact plenum passage flows longitudinally along the plenum passage and a portion of the gas flows transversely into and through the porous leading edge segment, and continues to move in a forward direction as it emerges into the external stagnation line region of the porous leading edge segment. The flow of coolant gas from the compact plenum passage into the porous segment establishes a suction action which enhances the cooling effect of the coolant gas flowing in the compact plenum passage. Also, the emergence of coolant gas from the external surface of the porous segment establishes a blowing action which reduces the rate of heat transfer from the hot external gas flow to the external leading edge surface in the stagnation line region. Thus, the present system provides maximum utilization of the amount of coolant supplied since it reduces the convective heating rate in the critical stagnation line region. In addition, the blowing action of the externally released coolant is followed by a cooling effect as the coolant is swept aft and mixes with the external boundary layer to cool external surfaces aft of the porous leading edge. With respect to the internal cooling action associated with longitudinal flow in the compact plenum passage, throughflow control may be provided at the end of the longitudinal passage to regulate the proportion of cooling provided by the convective action of the cooling gas flowing longitudinally in the compact plenum passage.

Accordingly, it is a primary object of the invention to provide an aerodynamic leading edge capable of withstanding the thermal shock environment and high temperature environment occurring during hypersonic flight through the atmosphere and during operation of gas turbine engines.

A further object of the invention is to provide a compact gas transpiration cooling system compatible with thin aerodynamic leading edges of a hypersonic vehicle or gas turbine blading and which efficiently cools said edges by both forward flow of coolant through the porous wall into the stagnation line region and longitudinal flow of coolant through a compact plenum passage located within the leading edge and generally disposed parallel to it.

DESCRIPTION OF THE PREFERRED EMBODIMENTS

The present invention generally provides a transpiration cooling system wherein a gaseous coolant is supplied to a leading edge structure through a partially porous tubular plenum chamber. The gaseous coolant after flowing through the leading edge section and removing heat there from, moves into the region of the leading edge stagnation line and blows outwardly against the oncoming air stream. This blowing action produces a significant reduction in forced convection, aerodynamic heating in the critical stagnation zone. From the region of the leading edge stagnation line, the coolant is blown aft along the surface of the leading edge to provide an additional cooling function which is referred to as film cooling.

Figure 1:
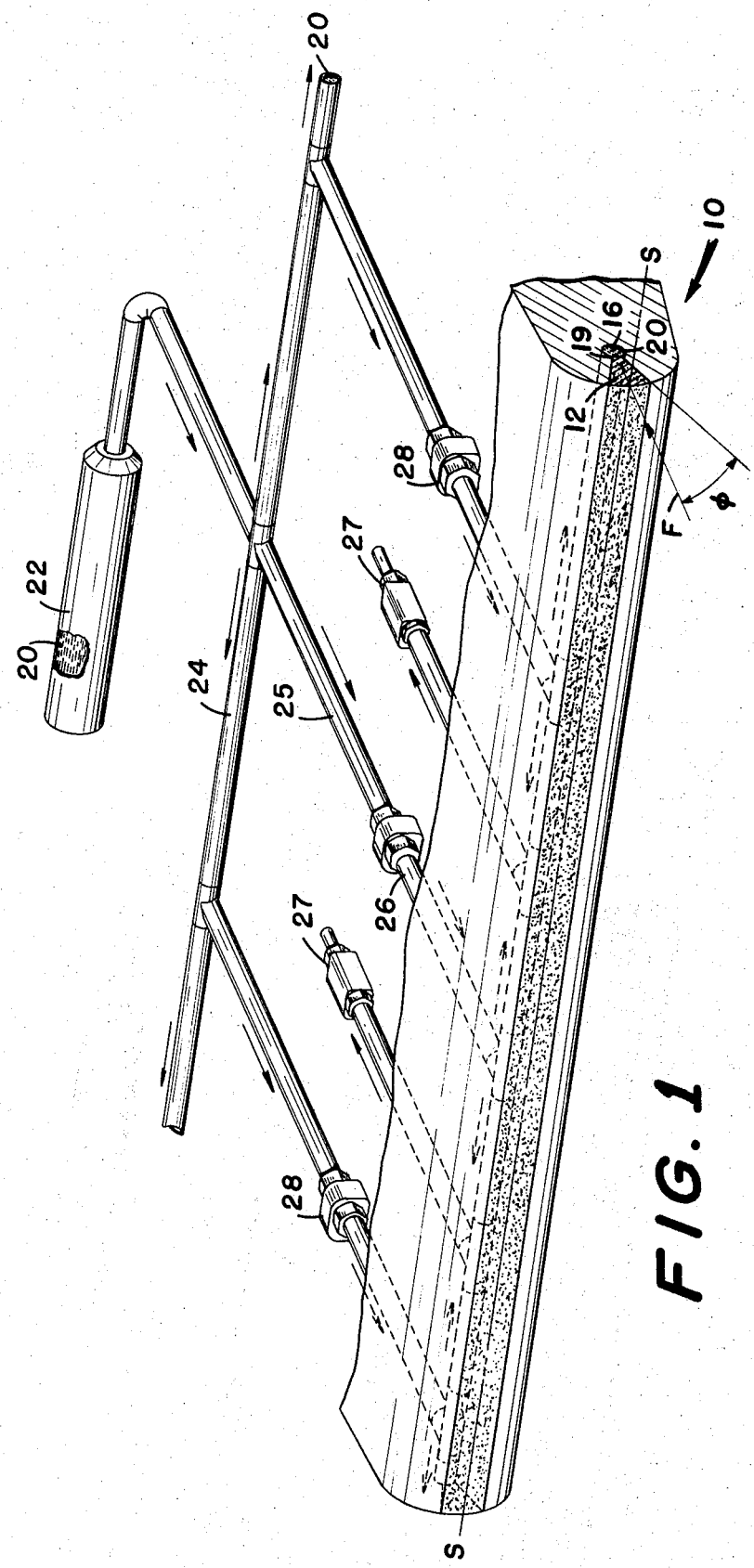
FIG. 1 is a schematic of the present cooling system depicting a portion of a hypersonic leading edge.
Figure 2:
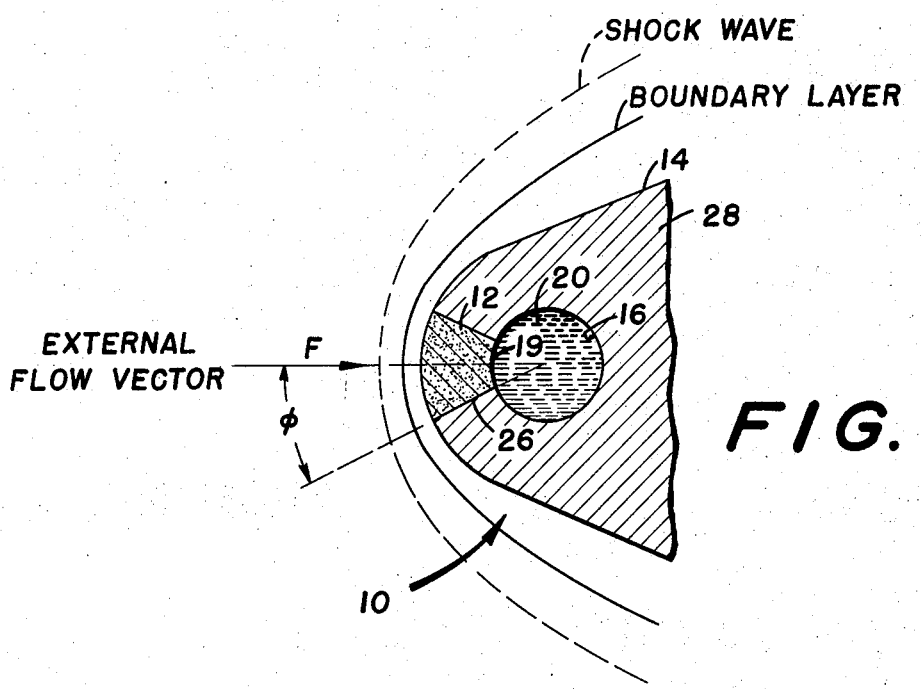
FIG. 2 is a section taken through line 2—2 of FIG. 1 of a hypersonic leading edge fitted with the present transpiration cooling system.

The invention is better understood by making reference to the drawings and particularly to FIGS. 1 and 2. A portion of a hypersonic leading edge is shown in FIG. 1 and a greatly enlarged cross-section of this leading edge is presented in FIG. 2. The leading edge is comprised of a porous central segment 12 and a non-porous airfoil body section 14. The porous segment 12 is formed into a wedge-like dihedral body with its side planar surfaces extending toward the geometrical center of the leading edge 10. A tube-like plenum chamber 16 is disposed within the edge 10 with its axis substantially parallel to the length-wise span of the porous central segment 12. The chamber 16 is formed simply by providing a channel in the section 14. The porous central segment 12 is sealably fitted into the plenum chamber 16 through a longitudinal slot 19 in the chamber, the blunt vertex portion 21 of the dihedral angle formed by segment 12 communicating with the chamber 16.

The plenum chamber 16 is supplied with gaseous coolant 20 stored in a remotely disposed pressurized tank 22, through a main supply line 24. The coolant 20 may be nitrogen or other relatively inert gaseous substance which preferably has a high heat absorption capability. The supply line 24 acts as a passive manifold to feed a plurality of inlet flow supply lines 25 which connect directly to the plenum chamber 16 at spaced intervals along the length of the chamber. Intermediately between the lines 25 are coolant bleed lines 26 for purging relatively warm coolant 20 from the plenum chamber 16 through bleed valves 27. Supply valves 28 controlled by a stagnation pressure sensor or a temperature sensor (not shown) may be used to meter the flow of coolant 20 into the plenum chamber 16. The spacing between the inlet flow supply lines 25 and bleed lines 26 may vary according to the design requirements of a particular system installation.

As can be also seen in FIG. 1, the flow of the coolant 20 into the plenum chamber 16 from the supply lines 25 is bi-directional, i.e., coolant 20 entering the chamber 16 flows in both directions along the longitudinal axis of the chamber. Consequently, the flow of the coolant 20 entering the alternately spaced bleed lines 26 is also bi-directional. This bi-directional flow is important in that more efficient cooling is accomplished than would be possible with a unidirectional coolant flow. If the coolant 20 were to enter the chamber 16 at one end thereof and flow to an exit line at the other end thereof, the coolant at the exit end of the chamber would be too heated to effectively cool the leading edge structure at the exit end of the chamber. The bi-directional coolant flow between successive supply lines 25 thereby provides maximum cooling efficiency at every point in the stagnation line region of the leading edge 10.

The coolant 20 within the plenum chamber 16 not only flows axially within the chamber, but also flows or "transpires" radially out through the porous segment 12. The flow of coolant 20 from the chamber 16 into the porous segment 12 establishes a suction action which enhances the cooling effect of the coolant 20 flowing in the plenum chamber 16. The coolant 20 is further forced under pressure of the supply system toward the external surface of the porous segment 12, said external surface being heated by the hypersonic air flow incident on the leading edge 10. The coolant 20 exiting the porous segment 12 cools the leading edge 10 not only by absorbing heat from the porous segment 12 but also by effectively blocking incoming convective heat flow. Thus, the outward flow of coolant actually prevents the leading edge 10 from heating to an undesired temperature by exerting a positive blowing effect which blocks convective heat transfer. Coolant carried away from the edge 10 by the airflow also reduces the heat loading acting on external surfaces aft of the porous segment 12.

Figure 3:
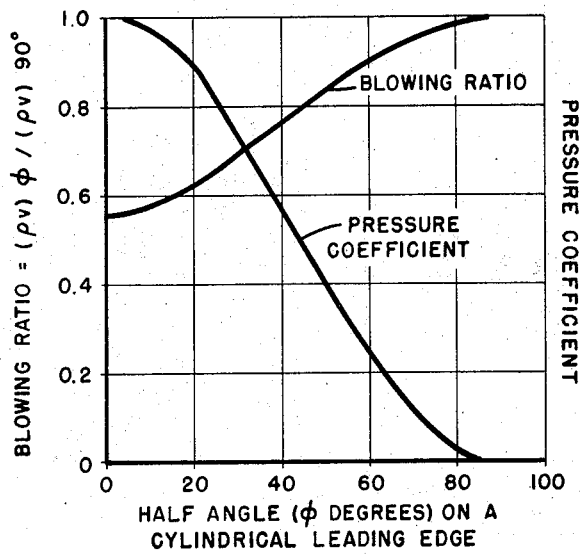
FIG. 3 is a graph which presents data necessary to determine the most efficient range of values of the half angle $\theta$.

The porous segment 12 is seen in FIG. 1 to be symmetrical with respect to a stagnation line S-S which is perpendicular to the external flow vector F. The segment 12 is further seen to occupy a dihedral angle of $2\theta$, where $\theta$ is the half-angle between a line through the flow vector F and a side planar surface 29 of the segment 12. For hypersonic flow applications the half angle $\theta$, shown in FIG. 2, must remain below 45° for efficient operation of the transpiration system. This statement is supported by the data shown in FIG. 3. In FIG. 3 the Newtonian pressure is noted to vary significantly with the angle $\theta$. Because of this pressure variation, values of $\theta$ greater than 45° result in excessive blowing rates as the half angle increases, thus making inefficient use of the coolant flow provided from the compact plenum chamber 16. The data of FIG. 3 relates to an explicit example for a hypersonic leading edge structure and is not of general application.

Figure 4:
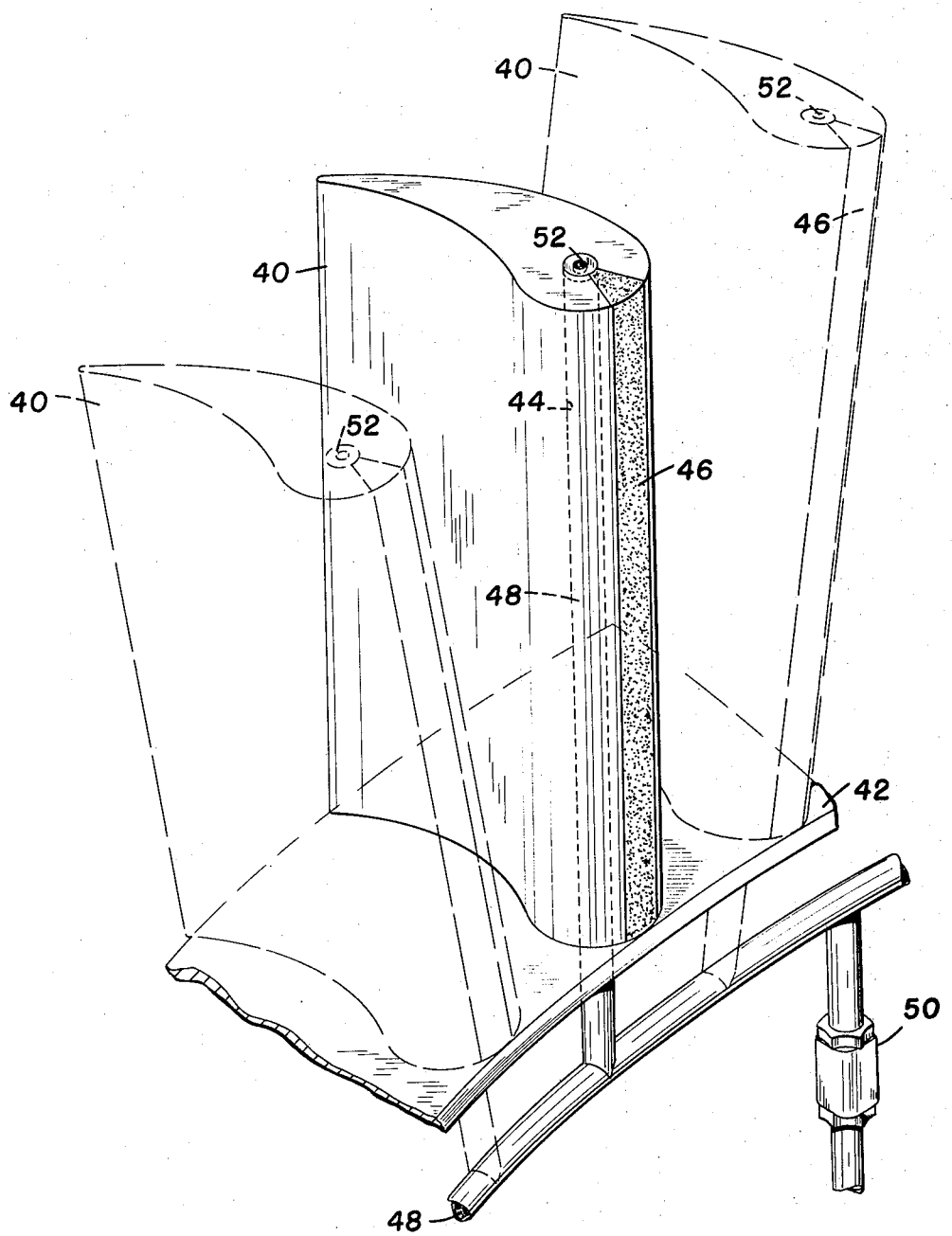
FIG. 4 is a perspective of a turbine blade having a thin leading edge fitted with the present transpiration cooling system and operating in a high temperature gas turbine.

That portion of the coolant 20 which flows through the porous plenum chamber 16 without passing through the porous segment 12 absorbs a finite amount of heat and removes this heat from the leading edge 10 when the coolant 20 is perged from the chamber 16 through the bleed valves 27. Heat is thus removed from the leading edge both as a result of the axial flow of the coolant 20 through the porous plenum chamber 16 and the radial transpiration of the coolant through the porous segment 12. FIG. 4 illustrates a second application for the invention which utilizes this dual cooling capability. A plurality of turbine blades 40 are shown to be formed on a turbine wheel 42, only one of the blades 40 being shown in detail since the structure of each of the blades is identical. The blade 40 is fitted with an axial plenum chamber 44 disposed in one edge of the blade. The chamber 44 communicates with a porous segment 46 along the length of the chamber, the outer surface of the segment 46 formed a portion of the external surface of the blade 40. The chamber 44 receives coolant 48 through an inlet control orifice 50 which meters the coolant into the chamber from a pressurized coolant storage tank (not shown) in the hub of the wheel 42. An exit flow control orifice 52 allows overflow of the coolant 48 from the opposite end of the turbine blade. In the high temperature environment of the turbine blade 40, coolant transpirational flow through the porous segment 46 reduces the environmentally-imposed heat loading on the blade. Thus, the invention finds utility not only in hypersonic flight applications where relatively thin leading edges on aerodynamic surfaces prevent the use of bulky prior art transpiration cooling systems, but also in the sharp leading edges of gas turbine blades operating in a high temperature environment.

We claim:

1. Apparatus for cooling relatively thin aerodynamic structures subject to extreme heat loading, comprising:

a leading edge member having a channel disposed therein, the channel forming a plenum chamber which is substantially parallel to the forwardmost surfaces of the member;

a porous member formed into the forwardmost portion of the leading edge member, the rear portion of said porous member intersecting and communicating with the aforementioned channel along its length;

a fluid coolant;

means for storing the coolant remotely from the leading edge member;

means for supplying the coolant to the aforementioned channel in the leading edge member; and, means for bleeding excessive and relatively warm coolant from the channel.

2. The apparatus of claim 1 wherein the coolant comprises a gas.

3. The apparatus of claim 1 wherein the means for storing the coolant comprises a pressurized tank.

4. The apparatus of claim 3 wherein means for supplying the coolant to the channel in the leading edge member comprises at least one main supply line and a plurality of inlet supply lines emanating from said main supply line and connecting to the channel at spaced points along said channel, thereby to supply the channel with coolant at spaced intervals therealong.

5. The apparatus of claim 4 wherein the means for bleeding coolant from the channel comprises bleed lines extending from the channel and spaced alternately between the inlet supply lines and bleed valves fitted on the bleed lines.

6. The apparatus of claim 5 and further comprising means for controlling the flow of coolant into the channel.

7. The apparatus of claim 1 wherein the porous member is wedge-like in cross-section and has side planar surfaces which extend toward the geometrical center of the leading edge member.

8. The apparatus of claim 7 wherein the angle formed by continued lines drawn along the side planar surfaces of the porous member is less than 45°.

9. The apparatus of claim 7 wherein the porous member is symmetrical about an aerodynamically induced stagnation line acting substantially along the forwardmost surface of the leading edge member.

10. Apparatus for relieving stagnation temperatures generated on a relatively thin leading edge structure moving at hypersonic velocity through the atmosphere, comprising:

a porous member formed in the leading edge structure and essentially facing the airflow directed against the leading edge structure;

a compact tubular plenum chamber disposed within the leading edge structure with the longitudinal axis thereof essentially parallel to the lengthwise span of the structure, the tubular chamber intersecting and communicating with the porous member along the rear portion of said member;

a gaseous coolant; and, means for storing the gaseous coolant and supplying said coolant to the tubular plenum chamber, the coolant supplied to the plenum chamber transpiring radially through the porous wall thereof and into the porous member whereby heat is absorbed by the coolant and convective heat transfer is effectively blocked by the radial flow of the coolant through the porous member and forwardly into the flow of air incident on the leading edge structure.

* * * * *